United States Patent
Mizuno

(10) Patent No.: US 7,523,253 B2
(45) Date of Patent: *Apr. 21, 2009

(54) STORAGE SYSTEM COMPRISING A PLURALITY OF TAPE MEDIA ONE OF WHICH CORRESPONDING TO A VIRTUAL DISK

(75) Inventor: Yoichi Mizuno, Yokohama (JP)

(73) Assignees: Hitachi, Ltd., Tokyo (JP); Hitachi Computer Peripherals Co., Ltd., Kanagawa-ken (JP)

(*) Notice: Subject to any disclaimer, the term of this patent is extended or adjusted under 35 U.S.C. 154(b) by 304 days.

This patent is subject to a terminal disclaimer.

(21) Appl. No.: 11/514,842

(22) Filed: Sep. 5, 2006

(65) Prior Publication Data

US 2007/0266204 A1 Nov. 15, 2007

(30) Foreign Application Priority Data

May 15, 2006 (JP) ............................. 2006-135773

(51) Int. Cl.
*G06F 13/00* (2006.01)
(52) U.S. Cl. ..................... 711/111; 711/154; 711/162
(58) Field of Classification Search ................. 711/111, 711/154, 162
See application file for complete search history.

(56) References Cited

U.S. PATENT DOCUMENTS 7,308,528 B2 * 12/2007 Kitamura et al. ............ 711/111
2004/0148458 A1 7/2004 Sekine et al.

FOREIGN PATENT DOCUMENTS

JP 2004-227448 1/2003

* cited by examiner

*Primary Examiner*—Reba I Elmore

(57) ABSTRACT

A plurality of virtual disks that emulate disk devices and a controller for controlling data access commands from a host are provided. The controller reserves a disk space on one or more disk devices with respect to a designated virtual disk among the plurality of virtual disks, reads data to the disk space from a target tape medium constituting a tape medium that corresponds with the designated virtual disk among the plurality of tape media and, when a data access command to the designated virtual disk is received from the host, performs data access to the disk space, not to the target tape medium 132.

20 Claims, 11 Drawing Sheets

FIG. 4

LUN MAPPING TABLE 1111

| VIRTUAL DISK LUN (1111a) | HOST INFORMATION (1111b) | DISK LUN (1111c) | TAPE LUN (1111d) | ... |
|---|---|---|---|---|
| 0 | WWN:A,LUN0 | 0,1 | 0 | |
| 1 | WWN:A,LUN1 | — | 1 | |
| 2 | WWN:B,LUN0 | — | 2 | |
| ⋮ | ⋮ | ⋮ | ⋮ | |

FIG. 5

VIRTUAL DISK LU MANAGEMENT TABLE 150

| VIRTUAL DISK LUN (150a) | VIRTUAL GROUP ID (150b) | SIZE (150c) | INITIAL WRITE FLAG (150d) |
|---|---|---|---|
| 0 | 0 | 10G | 1 |
| 1 | 0 | 5G | 0 |
| ⋮ | ⋮ | ⋮ | ⋮ |

FIG. 6

RAID GROUP MANAGEMENT TABLE 151

| RAID GROUP ID (151a) | DISK LUN (151b) | DISK ID (151c) |
|---|---|---|
| 0 | 0,1 | 0,1,2,3 |
| 1 | 2,3,4 | 4,5,6,7 |
| ⋮ | ⋮ | ⋮ |

FIG. 7

DISK LU MANAGEMENT TABLE 154

| DISK LUN 154a | SIZE 154b | DISK ADDRESS 154c | DISK LU STATUS 154d | LAST TAPE LUN ADDRESS 154e |
|---|---|---|---|---|
| 0 | 5G | 1:0:-0:1000<br>1:0:-1:1000 | IN USE | 0-0~0-2000 |
| 1 | 5G | ... | IN USE | 0-2000~0-4000 |
| ⋮ | ⋮ | ⋮ | ⋮ | ⋮ |

FIG. 8

TAPE GROUP MANAGEMENT TABLE 152

| TAPE GROUP ID 152a | TAPE LUN 152b | TAPE ID 152c |
|---|---|---|
| 0 | 0,1,2 | 000,001,002 |
| 1 | 3,4 | 003,004,005 |
| ⋮ | ⋮ | ⋮ |

FIG. 9

TAPE LU MANAGEMENT TABLE 153

| TAPE LUN 153a | SIZE 153b | TAPE ADDRESS 153c |
|---|---|---|
| 0 | 10G | 000-0~000-100 |
| 1 | 5G | 000-101~000-150 |
| ⋮ | ⋮ | ⋮ |

FIG. 17

| VIRTUAL DISK STATUS (1113a) | READ/WRITE COMMAND (1113b) | CONTROL COMMAND (1113c) |
|---|---|---|
| ACTIVE | PERMITTED | PERMITTED |
| ACTIVATE | DISABLED | PERMITTED |
| SEQREAD | READ PERMISSION/ WRITE-DISABLED | PERMITTED |
| SR-PREPARE | DISABLED | PERMITTED |
| INACTIVE | DISABLED | PERMITTED |
| INACTIVATE | DISABLED | PERMITTED |
| ERROR | DISABLED | PERMITTED |
| SEQWRITE | READ-DISABLED/ WRITE PERMISSION | PERMITTED |
| SW-PREPARE | DISABLED | PERMITTED |

STORAGE SYSTEM COMPRISING A PLURALITY OF TAPE MEDIA ONE OF WHICH CORRESPONDING TO A VIRTUAL DISK

CROSS-REFERENCE TO PRIOR APPLICATION

This application relates to and claims priority from Japanese Patent Application No. 2006-135773, filed on May 15, 2006, the entire disclosure of which is incorporated herein by reference.

BACKGROUND OF THE INVENTION

1. Field of the Invention

The present invention relates to a storage controller of a storage system that comprises a plurality of tape media.

2. Description of the Related Art

For example, Japanese Patent Application Laid Open No. 2004-227448 discloses technology that virtually emulates a magnetic tape medium by means of a disk device. According to this technology, files of a virtual tape are created from virtual tape storage space on the disk device and the files of the virtual tape thus created are transferred by means of a function for copying files between disk devices to the files of a virtual tape of another system.

Further, electronic data that must be archived for long periods is increasing as a result of regulations and so forth. Magnetic tape media (referred to simply as 'tape' hereinbelow) are considered to be more effective than disk devices from a cost perspective, for example, for archiving large-capacity data for long periods. Generally, this is because the bit cost (cost per bit) is low in comparison with that of a disk device.

Therefore, technology that installs a plurality of tapes in a storage system and provides a host device of the storage system with the plurality of tapes virtually as a plurality of disk devices maybe considered. As a result, data can be written and read to and from the tapes by accessing the virtual disk devices.

However, according to this technology, because the disk devices are virtual and the actual storage devices are tapes, there is the possibility of so-called random access occurring. Consequently, reading takes time and there is the possibility of time-out occurring in the host device. When a tape library in particular is used, it is necessary to read from the tape after loading the tape in the tape drive and positioning the tape at the object address (tape cueing), which increases the possibility of time-out.

SUMMARY OF THE INVENTION

An object of the present invention is to increase the speed of the reading of a storage system that comprises a plurality of tapes.

Further objects of the present invention will become apparent from the following description.

The storage system according to the present invention is connected to one or more higher-level devices including a host and comprises a plurality of tape media for storing data; a storage device capable of performing random access, which is access in which the access destination varies randomly, at a higher speed than the tape media; a plurality of virtual storage devices that emulate the storage device; and a controller for controlling data access commands from the host. The controller reserves storage space on one or more of the storage devices for a designated virtual storage device which is a virtual storage device designated among the plurality of virtual storage devices, reads data to the storage space from a target tape medium which is a tape medium that corresponds with the designated virtual storage device among the plurality of tape media and, upon receiving a data access command with respect to the designated virtual storage device from the host, performs data access to the storage space and not to the target tape medium.

According to a first embodiment, a tape LU that is a logical storage unit may be mapped to each of the plurality of virtual storage devices. When another tape LU exists in a tape medium having an end of a target tape LU that is mapped to the designated virtual storage device, the controller is able to read data to the storage space from two or more tape LUs including the target tape LU and the other tape LU. Data of other tape LUs do not exist in the tape medium having the ends of two or more tape LUs beyond the ends of the tape LUs.

According to a second embodiment, the controller is able to pre-read data in the target tape medium to the storage space before data access to the designated virtual storage device occurs.

According to a third embodiment, in the second embodiment the controller accepts a predetermined prepare command with respect to the designated virtual storage device from any of the one or more higher-level devices and, when the prepare command is received, the controller is able to reserve the storage space for the designated virtual storage device.

According to a fourth embodiment, in the third embodiment the controller is able to manage the status of the designated virtual storage device and send back the status in response to an inquiry from the host, rendering the status of the designated virtual storage device a first status while data are being read from the target tape medium to the storage space and rendering the status of the designated virtual storage device a second status when the reading of data from the target tape medium to the storage space has ended.

According to a fifth embodiment, the controller is able to reserve the released storage space and, when a predetermined event has occurred, release the reserved storage space.

According to a sixth embodiment, the controller is able to perform control so that data reading is not performed from the target tape medium to the storage space when data of a read target from the target tape medium already exist in the reserved storage space.

According to a seventh embodiment, the controller is able to perform control so that data reading is not performed from the target tape medium to the storage space when data access to the designated virtual storage device is made for the first time.

According to an eighth embodiment, the controller is able to write data in the reserved storage space to the target tape medium when a predetermined event has occurred.

According to a ninth embodiment, in the eighth embodiment the controller is able to accept a predetermined prepare end command with respect to the designated virtual storage device from any of the one or more higher-level devices and, when the prepare end command is received, write data in the storage space for the designated virtual storage device to the target tape medium.

According to a tenth embodiment, in the ninth embodiment the controller is able to manage the status of the designated virtual storage device and send back the status in response to an inquiry from the host, rendering the status of the designated virtual storage device a third status while data in the storage space are being written to the target tape medium and rendering the status of the designated virtual storage device a fourth status when the writing of data in the storage space to the target tape medium has ended.

According to an eleventh embodiment, in the eighth embodiment the controller is able not to write data in the reserved storage space to the target tape medium even when the predetermined event occurs when the writing of data to the reserved storage space has not taken place.

According to a twelfth embodiment, the controller is able to control whether direct access is made to the tape medium in accordance with the access mode selected among access modes of a plurality of types.

According to a thirteenth embodiment, in the twelfth embodiment the access modes of the plurality of types include sequential read mode; and, when the sequential read mode is selected, the controller is able to read data from the target tape medium and transmit the data to the host without passing the data via the one or more storage devices. Here, the reservation of the storage space need not be performed.

According to a fourteenth embodiment, in the thirteenth embodiment the sequential read mode may be selected when the entire designated virtual storage device is restored.

According to fifteenth embodiment, in the twelfth embodiment the access modes of the plurality of types include a sequential write mode; and, when the sequential write mode is selected, the controller is able to receive data from the host and write the received data to the target tape medium without passing the data via the one or more storage devices. Here, the reservation of the storage space need not be performed.

According to a sixteenth embodiment, in the fifteenth embodiment the sequential write mode may be selected when the entire designated virtual storage device is backed up.

According to a seventeenth embodiment, two or more tape LUs constituting logical storage units may be prepared in the plurality of tape media. Each of the two or more tape LUs may be mapped to each of the plurality of virtual storage devices. Two or more storage device LUs constituting logical storage units may be prepared in the one or more storage devices. The controller accepts a predetermined prepare command with respect to the designated virtual storage device from any of the one or more higher-level devices and, when the prepare command is received, is able to reserve one or more released storage device LUs equivalent to a storage capacity equal to or more than the target tape LU mapped to the designated virtual storage device and read data from the target tape LU to the one or more reserved storage device LUs, and accepts a predetermined prepare end command with respect to the designated virtual storage device from any of the one or more higher-level devices and, when the prepare end command is received, is able to write data on the one or more storage device LUs to the target tape LU and release the one or more storage device LUs.

The storage device may be a disk-type storage device or may be a memory-type storage device. A variety of disks such as a hard disk, optical disk, or magneto-optical disk, for example, can be adopted as the disk-type storage device. A variety of memory such as a semiconductor memory or flash memory, for example, can be adopted as the memory-type storage device.

Each of the processes of the controller can be executed by the respective parts thereof. The respective parts can also be called the respective means. The respective parts can also be implemented by hardware (a circuit, for example), a computer program, or a combination thereof (one or a plurality of CPUs that read and execute the computer programs, for example). The respective programs can be read from the storage resources (memory, for example) provided in the computer machine. The storage resources can be installed via a recording medium such as a CD-ROM or DVD (Digital Versatile Disk) or can be downloaded via a communication network such the Internet or a LAN.

BRIEF DESCRIPTION OF THE DRAWINGS

FIG. 4 shows an example of an LU mapping table;

FIG. 5 shows an example of a virtual disk management table;

FIG. 6 shows an example of a RAID group management table;

FIG. 7 shows an example of a disk LU management table;

FIG. 8 shows an example of a tape group management table;

FIG. 9 shows an example of a tape LU management table;

FIG. 17 shows an example of the IO management table 1113 according to another embodiment of the present invention;

DETAILED DESCRIPTION OF THE PREFERRED EMBODIMENT

A first embodiment of the present invention will be described hereinbelow with reference to the drawings. Further, when the same constituent elements are described distinctly in the following description, same are described by using a set of parent and child signals.

Figure 1:
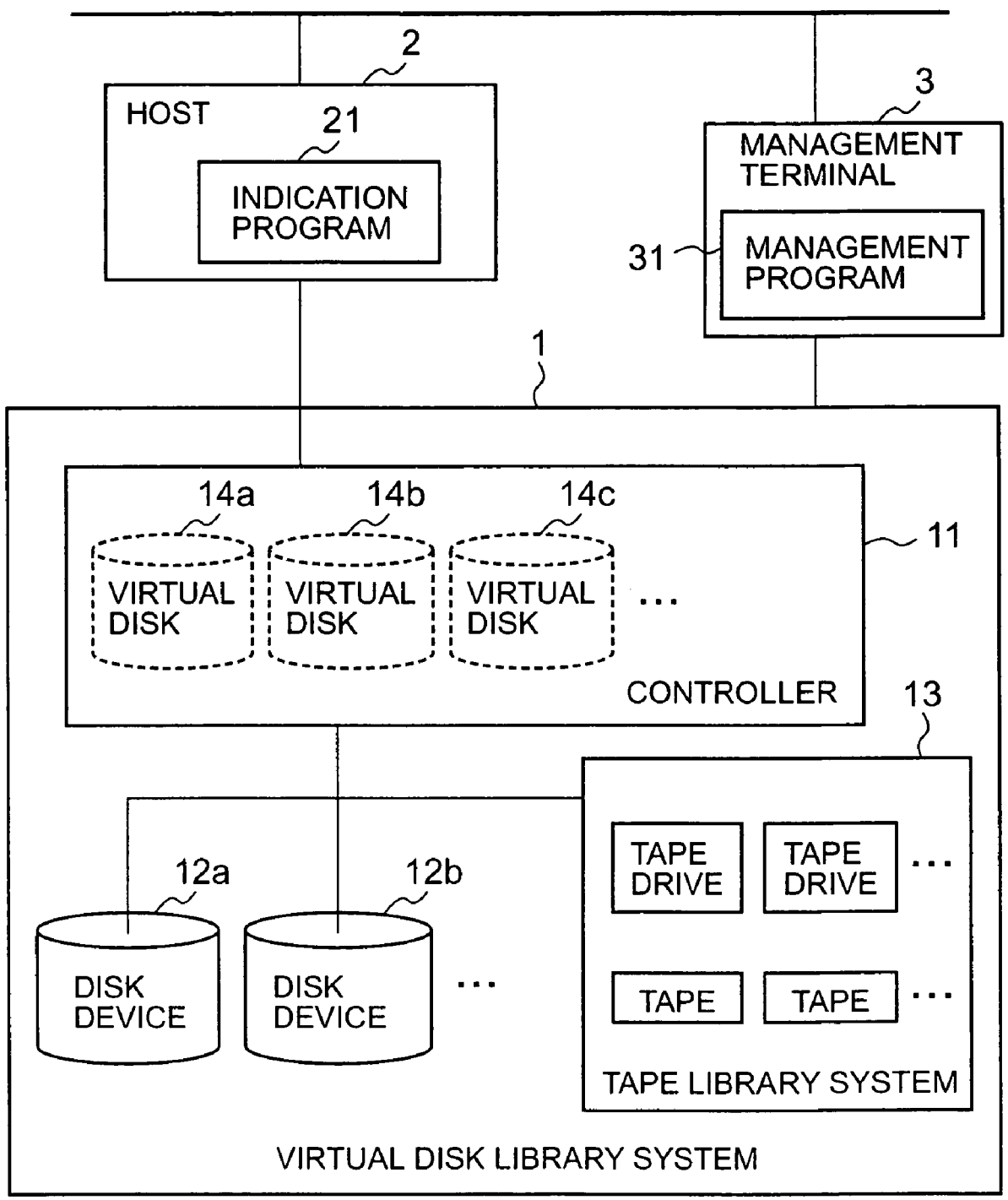
FIG. 1 is a constitutional example of a computer system according to a first embodiment of the present invention.

FIG. 1 shows a constitutional example of a computer system according to a first embodiment of the present invention.

A host device (called simply 'host' hereinbelow) 2 and a management terminal 3 are connected to a virtual disk library system 1. The host device 2 and management terminal 3 are also mutually connected. The respective connections may be made via a dedicated wire or via a communication network.

The host 2 and management terminal 3 are both one type of computer that comprises a CPU (not shown) and a storage resource (not shown), and so forth. An indication program 21, for example, is stored in the storage resource of the host 2 and an indication is issued to the virtual disk library system 1 as a result of the indication program 21 being executed by the CPU of the host 2. Meanwhile, a management program 31, for example, is stored in the storage resource of the management terminal 3 and management of the virtual disk library system 1 is performed as a result of the management program 31 being executed by the CPU of the management terminal 3. There may be a plurality of hosts 2. The management terminal 3 need not necessarily be provided. The host 2 can also be combined with the management terminal 3 and the management program 31 may also be run on the host 2. The indication program 21 may also be disposed in the management terminal 3 and an Out-Of-band indication to the virtual disk library system 1 (more specifically, an indication from the management terminal 3 constituting a separate terminal from the host 2 that issues a write command or a read command) is also possible. When the program is the subject hereinbelow, processing is actually performed by the CPU that executes the program.

The virtual disk library system 1 comprises a controller 11, one or a plurality of disk devices 12, and a tape library system 13. The tape library system 13 comprises a plurality of tapes 132 and one or a plurality of tape drives 131. Each of the tape drives 131 is able to write data to the loaded tapes 132 and read data from the loaded tapes 132.

The controller 11 controls access from the host 2. The controller 11 provides the host 2 with virtual disks 14 that simulate disk devices. The controller 11 is able to read data on the tapes 132 to the disk cache (staging) and write data in the disk cache to the tapes 132 (destaging) by using the disk devices 12 as disk cache.

Figure 2:
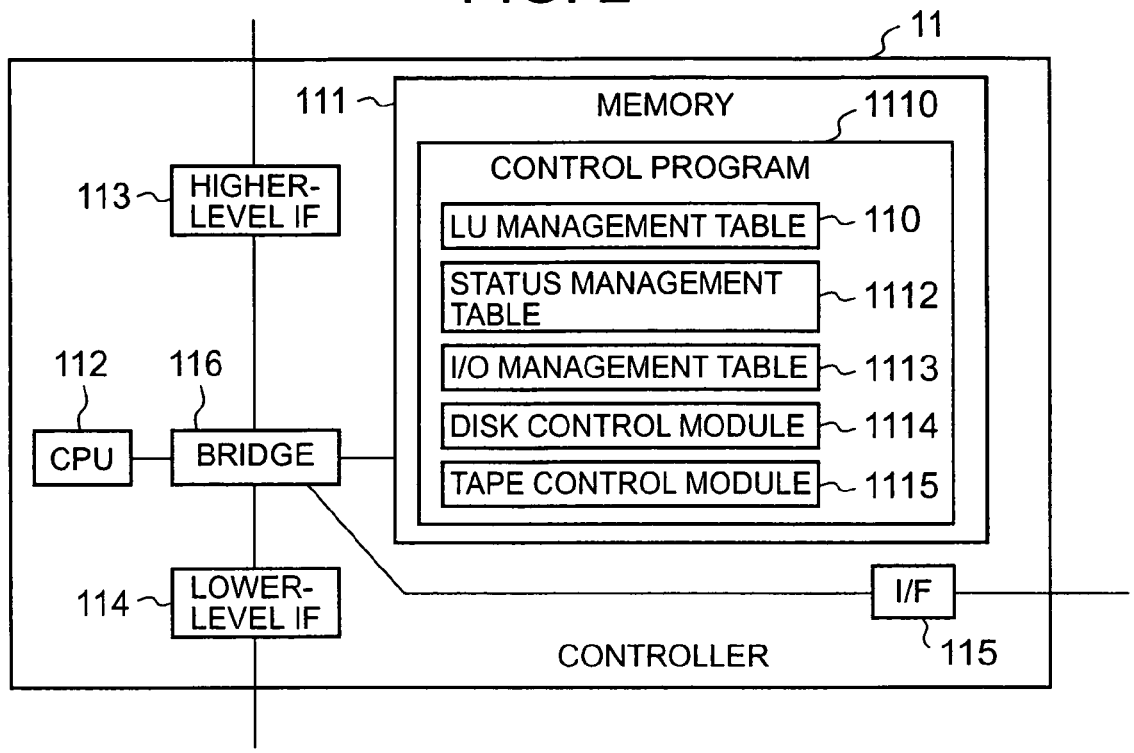
FIG. 2 shows an example of the constitution of a controller 11.

FIG. 2 shows an example of the constitution of the controller 11.

The controller 11 comprises a memory 111, a CPU 112, a higher-level IF 113, a lower-level IF 114, an IF 115, and a bridge 116.

Various information that is required in order to control the virtual disk library system 1 is stored in the memory 111. The variety of information includes, for example, the control program 1110 for controlling the virtual disk library system 1 and control information relating to the virtual disk library system 1 and so forth. Further, the memory 111 is also used as a cache memory for temporarily storing data received from the host 2 and data read from the disk devices 12 or tapes 132. The control program 1110 comprises an LU mapping table 1111 for managing the LU, a status management table 1112 that describes the statuses of the virtual disks 14, an IO management table 1113 that describes the IO advisability for each status, a disk control module 1114 that controls access to the disk devices 12 ('disk access' hereinbelow), and a tape control module 1115 that controls access to the tapes 132 ('tape access' hereinbelow).

The CPU 112 controls the virtual disk library system 1 by executing the control program 1110.

The upper-level IF 113 performs I/O control between the host 2 and controller 11 and the lower-level IF 114 performs I/O control between the controller 11 and disk devices 12. The tape library system 13 is connected to the upper-level IF 113 and the lower-level IF 114. When the tape library system 13 is connected to the upper-level IF 113, the upper-level IF 113 performs IO control between the controller 11 and the tape library system 13. When the tape library system 13 is connected to the lower-level IF 114, the lower-level IF 114 performs IO control between the controller 11 and the tape library system 13. Various IF (interfaces) such as a Fibre Channel, SCSI (Small Computer System Interface), iSCSI (Internet Small Computer System Interface), Infiniband, SATA (Serial ATA), SAS (Serial Attached SCSI), and other IF can be adopted for the connection between the host 2 and disk devices 12 and so forth. The host 2 side is also known as the front end and the disk device 12 side is also called the back end. In this embodiment, there is one each of the upper-level IF 113 and lower-level IF 114 in order to facilitate understanding of the description, but a plurality of at least one of the upper-level IF 113 and lower-level IF 114 may also be provided.

The IF 115 is an IF that is provided separately from the IO of the data from the host 2 and used as a management port of the virtual disk library system 1. A variety of IF can also be applied for the IF 115. For example, a LAN (Local Area Network) connection can be applied.

The bridge 116 controls various transfers such as a data transfer between the CPU 112 and memory 111 and a data transfer between the upper-level IF 113 and memory 111.

A description of the controller 11 was provided hereinabove. Further, a plurality of controllers 11 may be provided in the virtual disk library system 1 for the purpose of load sharing or fail over, for example. In addition, the controller 11 may be limited to the constitution above or another constitution may be adopted. For example, the controller 11 can comprise a plurality of first control units (control circuit substrates, for example) that control communication with the host 2, a plurality of second control units (control circuit substrates, for example) that control communication with the disk devices 12 or tapes 132, a cache memory capable of storing data that has been transmitted from the host 2 and written to the disk devices 12 or tapes 132 and data that has been read from the disk devices 12 or tapes 132 and transmitted to the host 2, a control memory that is able to store data for controlling the virtual disk library system 13, and a connection unit (a switch such as a crossbar switch, for example) that connects each of the first control units, each of the second control units, the cache memory and the control memory. In this case, one of the first control unit and second control unit, or both in cooperation with one another, is able to perform the processing of the controller 11. The control memory may be dispensed with and, in this case, space for storing the information stored by the control memory may be provided in the cache memory.

A description of the logical volumes will be provided next.

Figure 3:
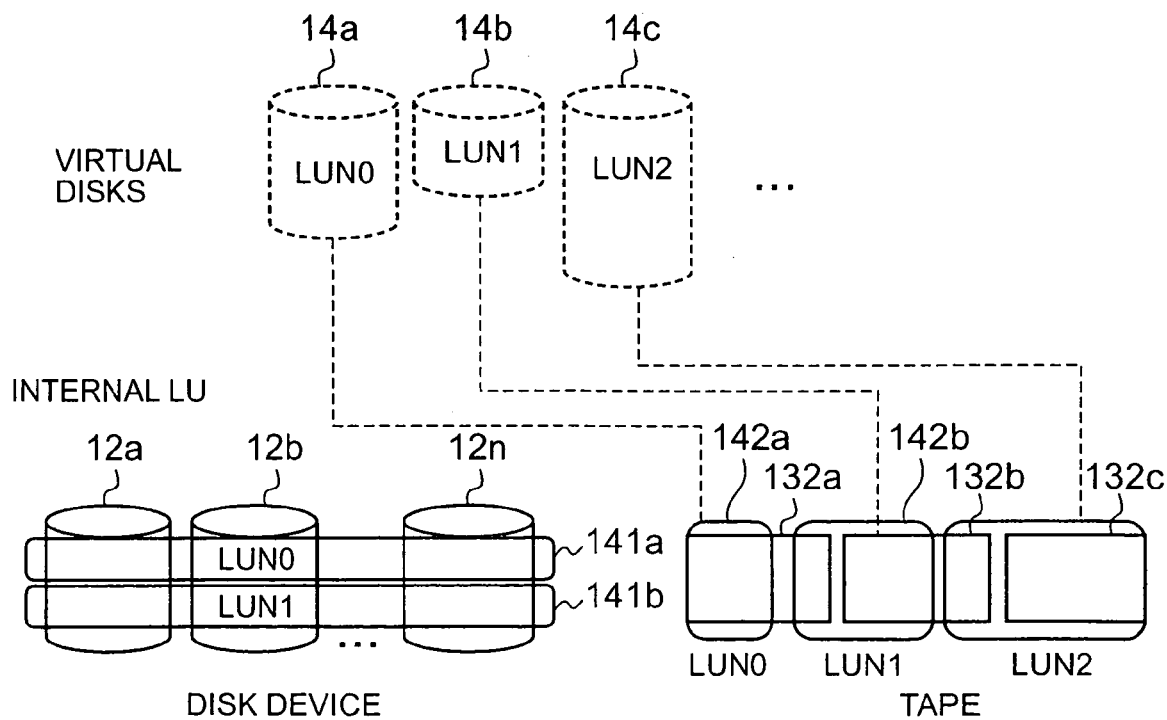
FIG. 3 schematically shows the allocation of logical volumes.

FIG. 3 schematically shows the allocation of logical volumes.

Normally, disk space is identified by the host 2 in units called logical volumes (LU: Logical Unit). The virtual disk library system 1 is able to virtually define and construct the logical volumes used by the host 2. In this embodiment, these logical volumes are called 'virtual disks'. The virtual disk library system 1 is able to assign serial numbers to the virtual disks 14 by means of integers starting from 0 in order to uniquely identify the logical volumes in the system 1. These numbers are called 'virtual disk LUN'.

Correspondingly, the logical volume representing the physical storage destination in the system 1 is called the 'internal LU'. More specifically, an internal LU created in the disk device 12 is called a 'disk LU' and an internal LU created on the tape 132 is called a 'tape LU'. For example, a RAID group (sometimes also called a 'parity group' or 'array group') can be formed from a plurality of disk devices 12 and one RAID group can define a plurality of disk LUs 141. Likewise, a tape group can be formed by a plurality of tapes 132 and a plurality of tape LUs 142 can be defined by one tape group. A disk LUN and tape LUN which are unique IDs for management within the virtual disk library system 1 are allocated to the disk LU 141 and tape LU 142 respectively.

The virtual disks 14 are mapped to an internal LUN that represents the physical storage destination within the system 1 when space for actually storing data is required. A plurality of internal LUs are linked and can also be mapped to one virtual disk 14. More specifically, one or a plurality of tape LUs 142 can be fixedly mapped to a virtual disk 14, for example, and disk LUs 141 can be dynamically mapped. The capacity of the virtual disk 14 and the storage capacity of the tape LU 142 mapped to the virtual disk 14 (the total storage capacity of the tape LUs 142 when a plurality of tape LU 142 are mapped) can be the same. Further, the disk LUs 141 that are dynamically mapped to the virtual disks 14 can be used as the disk cache as it is called in this embodiment. By dynamically mapping the disk LUs 141 rather than fixedly mapping same, the total storage capacity of the installed disk devices 12 (the number of disk devices 12, for example) can be suppressed by means of disk LUs of a total storage capacity that is smaller than the total storage capacity of the plurality of virtual disk LUs 14.

Further, when the storage destination of the data is changed from an internal LU 142a mapped to the virtual disk 14a to an internal LU 142b as a result of data migration and so forth, the internal LU mapped to the virtual disk 14a can be switched from the internal LU 142a to the internal LU 142b. As a result, when access (read or write access) is made to the virtual disk 14a, access can be made to the internal LU 142b of the migration destination.

An overview of this embodiment will be described hereinbelow by taking FIG. 3 as an example. Further, in the following description, the tape LU 142a (tape LUN0) is mapped to the virtual disk 14a (virtual disk LUN0).

Control commands of a plurality of types are supported by the virtual disk library system 1 in addition to data access system commands known as read commands and write commands and so forth. Control commands include, for example, an activate indication that causes the disk cache to prepare all the data in the tape LU and an inactivate indication for causing all the data in the disk cache to be reflected in the tape LU.

The following processes (A) to (C) are performed in this embodiment.

(A) The control program 1110 prepares all the data in the tape LU 142a in the disk cache before access to the virtual disk 14a occurs, in other words, before access to the tape LU 142a corresponding with the virtual disk 14a takes place. More specifically, for example, the indication program 21 of the host 2 (or management terminal 3) transmits an activate indication that designates the virtual disk 14a (before an access command to access the virtual disk 14a is issued by the host 2 (that is, before the virtual disk 14a is used), and the control program 1110 receives the activate indication. The control program 1110 allocates one or more unused (not allocated to any virtual disk 14, for example) disk LUs to the virtual disk 14a in response to the activate instruction. The storage capacity of one or more of the allocated disk LUs (the total storage capacity if there are a plurality of disk LUs) is equal to or more than the storage capacity of the virtual disk 14a and the one or more disk LUs (141a and 141b hereinbelow) are the so-called disk cache of this embodiment. The control program 1110 reads all the data in the tape LU 142a and writes all the data thus read to the disk cache. As a result, all the data in the tape LU 142a is prepared in the disk cache 141a and 141b.

(B) When an access command to access the virtual disk 14a is received from the host 2, the control program 1110 accesses the disk cache 141a and 141b in accordance with the access command and does not access the tape LU 142a that corresponds with the virtual disk 14a.

(C) The control program 1110 sequentially writes all the data in the disk cache 141a and 141b to the tape LU 142a when a predetermined event occurs and releases the disk LUs 141a and 141b that constitute the disk cache 141a and 141b (in other words, deletes the allocation). As a result, the disk LUs 141a and 141b can be allocated to the virtual disks 14 when the activate indication for the virtual disks 14 for which disk cache has not been reserved is received. Further, the case where a predetermined event has occurred in process (C) is a case where an inactivate indication is received from the host 2, for example. A case where a fixed time has elapsed after the tape disks 141a and 141b are finally updated or the like is also possible instead of or in addition to the former case.

According to processes (A) to (C) above, in the virtual disk library system 1, all the data in the tape LUs 142 are prepared on the disk devices 12 prior to access being made to the tape LUs 142 and the access to the tape LUs 142 is made to the disk devices 12 instead of to the tapes 132. As a result, access to the tape LUs 132 can be made at a higher speed than in cases where access is actually made to the tapes 132. This is particularly effective in cases where random access is made to tape LUs.

Further, in (A), for example, if all the data in the tape LUs 142a have not been prepared in the disk cache when the control program 1110 receives an access command with respect to the virtual disk 14a from the host 2, the user of the host 2 may be prompted to transmit an activate indication by sending back a predetermined error to the host 2 or the data in the tape LU 142a may be loaded in the disk cache without reporting the error to the host 2.

Further, in the example of FIG. 3, one tape group is constituted by three tape LUs 142a to 142c and three tape LUs 142a to 142c are linked in the tape group. A plurality of tape LUs can be mixed on the same tape 132 in one tape group. More specifically, for example, the ending address of the tape LU 142b and the starting address of the tape LU 142c are located midway along a tape 132b and, therefore, the tape LU 142b and tape LU 142c exist on the same tape 132b. That is, in this embodiment, a 'tape group' is constituted by one or more tapes 132, comprises one or more tape LUs 142, and links and stores a plurality of tape LUs. In (A) above, the control program 1110 is able to read all the data in the tape group comprising the tape LU 142a to the disk cache and is able, in (C) above, to write the data in the disk cache sequentially to the tape group. As a result, the control program 1110 is able to set the total storage capacities such that the total storage capacity of the disk LUs constituting the disk cache is equal to or more than the storage capacity of the tape group (the total storage capacity of the tape LUs 142a to 142c). In the event of a state where the data of the tape LUs other than the tape LU 142a does not exist, the control program 1110 may only read the data of tape LU 142a. In addition, there may be two or more tape LUs comprising a tape LU (target tape LU) corresponding with the designated virtual disk among the plurality of tape LUs that exist in one tape group. Thereupon, the data of other tape LUs that exist in the same tape group do not exist beyond the trailing edge on a tape that has the trailing edges of two or more of these tape LUs, for example. Further, the leading tape LU of the two or more tape LUs can be the target tape LU.

This embodiment will be described in detail hereinbelow. An LU management table 110 includes an LU mapping table, a virtual disk management table, a RAID group management table, a disk LU management table, a tape group management table, and a tape LU management group, for example. The various tables will be described hereinbelow.

FIG. 4 shows an example of an LU mapping table.

The LU mapping table 1111 describes the correspondence relationships between the logical volumes. More specifically, for example, the LU mapping table 1111 has a field 1111*a* in which a virtual disk LUN is written, a field 1111*b* in which host information indicating the WWN used for access by each host and the host LUN identified from the respective hosts are described; a field 1111*c* in which a disk LUN is written, and a field 1111*d* in which a tape LUN is written. A virtual disk LUN, host information, a disk LUN, and a tape LUN are associated with one virtual disk 14. When a disk LUN is described in FIG. 4, this signifies that the disk cache has been reserved and, when the disk LUN is not described, this means that disk cache has not been reserved.

Further, the host 2 detects the LU by searching the connected storage system when the OS is booting. The host 2 assumes that LUN exist as consecutive numbers and is able to search in order starting from zero. Hence, when a certain number does not exist, the subsequent search is sometimes not performed. This is a measure for shortening the search time. In such a case, when a virtual disk LUN is allocated to the host as is, the host 2 that allocates an LU other than the virtual disk LUN=0 is unable to detect the LU. Therefore, all the hosts 2 must be redefined in order to allocate the LUN starting from zero and by means of consecutive numbers. This is called the host LUN. Thus, the host LUN identified from the respective hosts 2 and the virtual disk LUN and internal LUN (disk LUN and tape LUN) are distinguished. The control program 1110 is able to ascertain which logical volume is to be allocated to which host 2 by referencing the LU mapping table 1111.

FIG. 5 shows an example of a virtual disk management table.

A virtual disk management table 150 is a table for managing virtual disks. More specifically, the virtual disk management table 150 has, for example, a field 150*a* in which virtual disk LUN are written, a field 150*b* in which the IDs of virtual groups are written, a field 150*c* in which the size (storage capacity) of virtual disks are written, and a field 150*d* in which initial write flags are set. A virtual disk LUN, a virtual group ID, a size, and an initial write flag are associated with one virtual disk 14. Further, a 'virtual group' is a group constituted by a plurality of virtual disks. In addition, the 'initial write flag' is a flag expressing whether writing to a virtual disk has started which is "1" when writing has not started and "0" when writing has started. That is, when virtual disks are set, the initial flags are all "1" and, when writing to the virtual disks takes place, the initial write flags corresponding with the virtual disks are "0".

FIG. 6 shows an example of a RAID group management table.

A RAID group management table 151 is a table for managing a RAID group. More specifically, for example, the RAID group management table 151 has a field 151*a* in which RAID group IDs are written, a field 151*b* in which disk LUs are written, and fields 151*c* in which the IDs of the disk devices (disk IDs) are written. A RAID group ID, the disk LUN of the disk LUs in the RAID group, and the disk IDs of the disk devices constituting the RAID group are associated with one RAID group.

FIG. 7 shows an example of a disk LU management table.

A disk LU management table 154 is a table for managing disk LUs. More specifically, for example, the disk LU management table 154 has a field 154*a* in which disk LUN are written, a field 154*b* in which the sizes (storage capacity) of the disk LUs are written, a field 154*c* in which disk addresses are written, a field 154d in which the disk LU statuses are written, and a field 154*e* in which the last tape LUN addresses are written. A disk LUN, size, disk address, disk LU status, and last tape LUN address are associated with one disk LU 141. Further, the 'disk address' is a value showing the location of a disk LU on a disk device 12 and can be expressed by using a set of the disk ID (0, for example), and the address on the disk device 12 (1000, for example), for example. The 'disk LU status' is the status of the disk LU 141 and includes 'in use' (allocated as disk cache) and 'unused' (not allocated to any disk cache, a state permitting allocation), for example. The 'last tape LUN address' expresses which address of a particular tape LUN the disk LU last used. When reserving the disk cache, the control program 1110 searches for a disk LU with an "unused" disk LU status and renders the disk LU thus found a constituent element of the reserved disk cache. Further, when a disk LU is allocated to the disk cache, the control program 1110 records the LUN and address of the tape LU that uses the disk cache in the field 'last tape LUN address' corresponding with the disk LU. In FIG. 4, because the correspondence relationship between the addresses of the tape LU and virtual disk LU is known, the used tape LUN address may be written as the address of the virtual disk LU (LUN and address).

FIG. 8 shows an example of the tape group management table.

A tape group management table 152 is a table for managing a tape group. More specifically, for example, the tape group management table 152 has a field 152*a* in which the IDs of tape groups are written, a field 152*b* in which the LUN of the tape LU in the tape group are written, and a field 152*c* in which the IDs of the tapes 132 constituting the tape group are written. A tape group ID, tape LUN, and tape ID are associated with one tape group.

FIG. 9 shows an example of a tape LU management table.

A tape LU management table 153 is a table for managing the tape LU 142. More specifically, for example, the tape LU management table 153 has a field 153*a* in which tape LUN are written, a field 153*b* in which the sizes (storage capacities) of tape LU are written, and a field 153*c* in which tape addresses are written. A tape LUN, size, and tape address are associated with one tape LU 132. Further, the 'tape address' is a value indicating the location of the tape LU 142 on the tape 132 and can be expressed by using a set of the tape ID (0, for example) and the address on the tape 132 (100, for example), for example.

Figure 10:
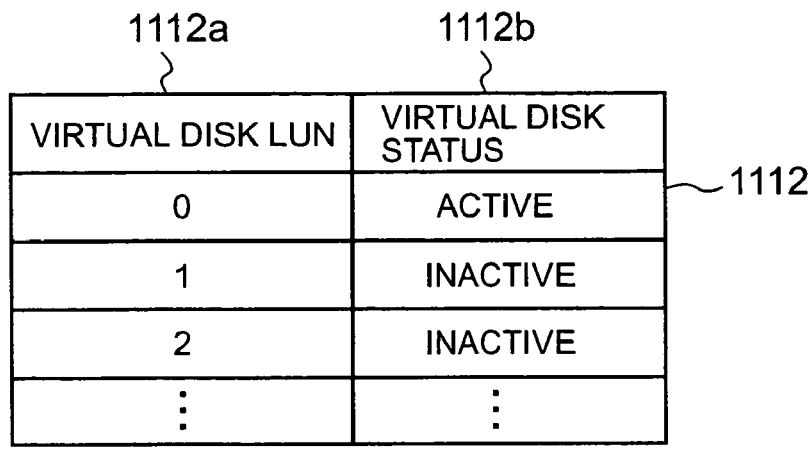
FIG. 10 shows an example of a status management table 1112.

FIG. 10 shows an example of the status management table 1112.

The status management table 1112 has a field 1111*a* in which the LUN of virtual disks are written and a field 1112*b* in which the statuses of the virtual disks (the 'virtual disk status' hereinbelow) are written. The virtual disk status can be referenced by the indication program 21 and the management program 31. Virtual disk statuses include "Active", which signifies a data-accessible state and "Inactive", which signifies a state where data access is impossible, and so forth. The indication program 21 and the management program 31 are able to ascertain the accessibility and current processing state of a target virtual disk according to the virtual disk status of the respective virtual disks. The processing content of the respective virtual disk statuses are processed by the IO management table described subsequently.

Figure 11:
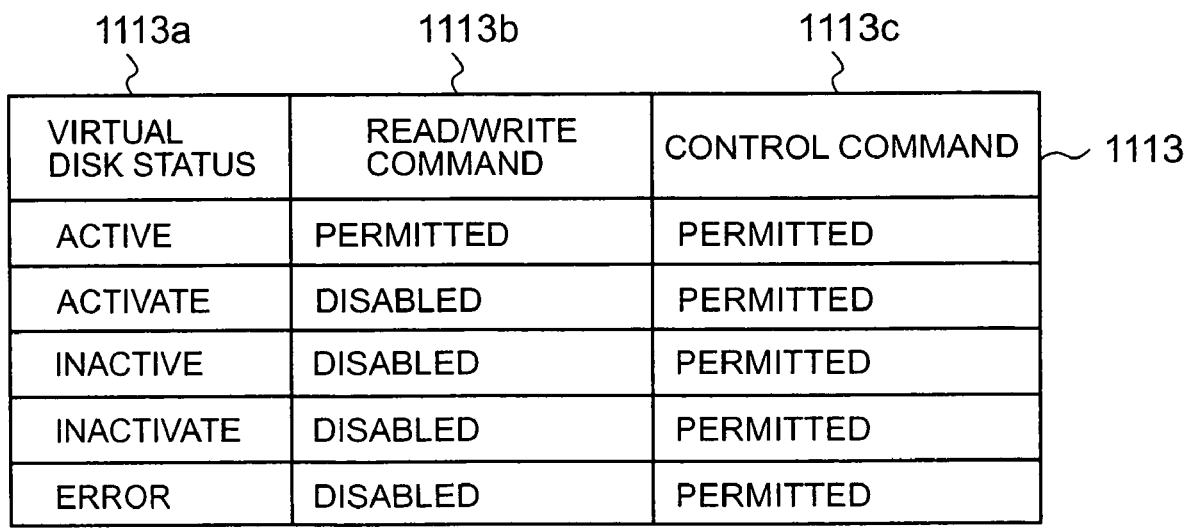
FIG. 11 shows an example of an IO management table 1113.

FIG. 11 shows an example of the IO management table 1113.

The IO management table 1113 has a field 1113*a* in which virtual disk statuses are written and a field in which the processing content of the virtual disk statuses are written. Fields in which the processing content is written include a field 1113*b* in which an indication of whether the processing of read/write commands is possible is written, and a field 1113*c* in which an indication of whether processing of control commands is possible is written. All the virtual disk statuses of the virtual disks are written in the field 1113*a*.

As shown in FIG. 11, although Read/Write is possible in an Active state, Read/Write is impossible in other states. A control command can be responded to in all states. An Active state is a state where preparations for access to a virtual disk end and data access from the host can be accepted. An Inactive state is a state where data are stored on a tape and data access is prohibited. An Activate state is a state of transition from an Inactive state to an Active state. An Inactivate state is a state of transition from an Active state to an Inactive state. An Error state is a state where access has not been possible due to a fault or the like. Thus, the IO advisability of each of these states can be determined. The host 2 performs data access from the target virtual disk to an Active state. The control command is accessible in any state.

Processing for performing virtual disk usage preparations will be described next.

The indication program 21 or management program 31 must perform a prepare indication with respect to the virtual disk library system 1 before data access by the host 2 to the target virtual disk 14 is started (before a read command or write command is issued). This indication is called an 'Activate indication'. Occasions where data access to the virtual disks 14 is required include, for example, a case where a data backup is performed to the virtual disk library system 1, a case where archive data are stored, a case where data backed up to a virtual disk library system 1 are restored, or a case where data that has been archived in the virtual disk library system 1 are read as a result of an audit or the like. In this case, the indication program 21 or management program 31 sends an Activate indication to the virtual disk library system 1. When the virtual disk usage schedule is already known such as when the backup target data are stored and so forth, the issue of the Activate indication can also be made automatic by means of a scheduler on the host 2 or management terminal 3.

Figure 12:
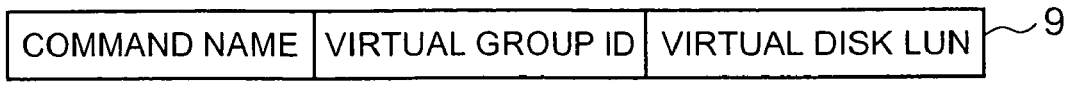
FIG. 12 shows an example of the format of a control command.

FIG. 12 shows an example of the format of a control command. The control command designates a command name, a virtual group ID or a virtual disk LUN. The virtual group ID is used when virtual disks are designated collectively. When a control command is issued to one virtual disk, the description of the virtual group ID is unnecessary. Further, when only a portion of the space of the virtual disk is used, the address of the portion may be designated through inclusion in the control command.

Further, a virtual disk dedicated to the receipt of instructions (a 'dedicated virtual disk' hereinbelow) is prepared in the virtual disk library system 1 beforehand, and the indication program 21 or management program 31 may always issue a control command to the dedicated virtual disk. Because the dedicated virtual disk does not actually need to store data, the dedicated virtual disk need not be mapped to an internal LUN. The LUN or virtual group ID of the virtual disk of the actual target is written in the control command that is issued to the dedicated virtual disk and, upon receiving the control command, the control program 1110 is able to perform processing in accordance with the LUN or virtual group ID of the virtual disk of the actual target.

Figure 13:
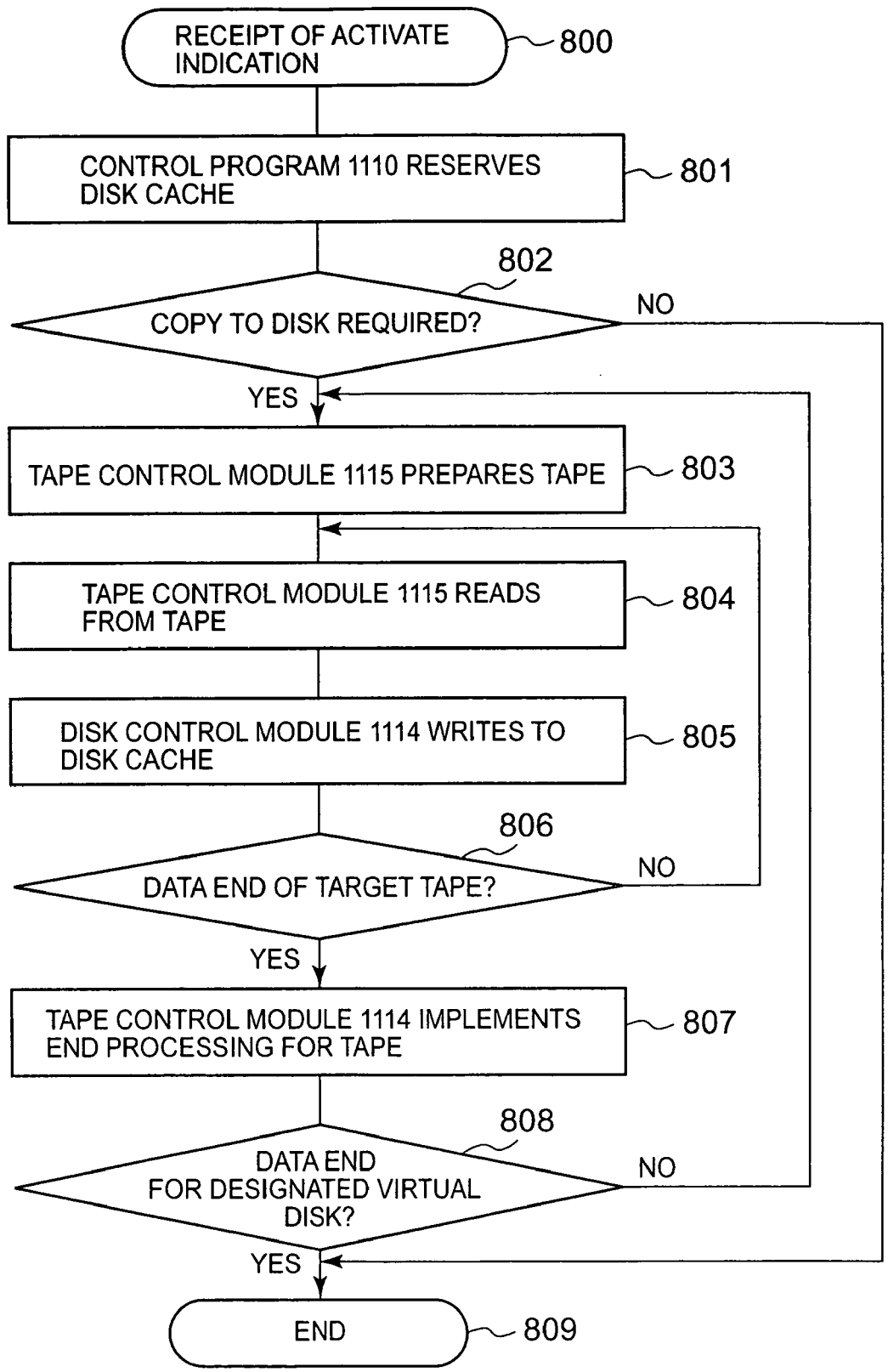
FIG. 13 shows an example of the flow of processing that is performed when a control program 1110 receives an Activate indication.

FIG. 13 shows an example of the processing that is performed when the control program 1110 receives an Activate indication. Further, in the following description, a virtual disk that corresponds with a virtual disk LUN or virtual group ID designated by the Activate indication is called a 'designated virtual disk'.

Upon receiving the Activate indication from the indication program 21 or management program 31 (step 800), the control program 1110 reserves disk space (disk cache) of the required capacity in the virtual disk (designated virtual disk) designated by the Activate indication (step 801). When a virtual group ID is designated by the Activate indication, the control program 1110 is able to acquire the virtual disk LUN corresponding with the virtual group ID from the virtual disk management table 150 (See FIG. 5). The control program 1110 reserves disk cache of a storage capacity equal to or more than the storage capacity of the designated virtual disk, registers the LUN of the disk LU constituting the disk cache in the LU mapping table 1111 (See FIG. 4) and changes the status of the disk LU in the disk LU management table 154 to "in use". When a disk LU is reserved, the control program 1110 references the last tape LUN address of the disk LU management table 154 and, if the tape LUN address corresponding with the designate virtual disk exists, the control program 1110 allocates the disk LUN. Further, when a disk LUN has already been allocated to the target virtual disk in the LU mapping table 111, the disk LUN can be used as is. Further, the control program 1110 informs the source that issued the Activate indication that disk cache cannot be reserved when the total storage capacity of the one or more disk LU available as disk cache (that is, with an "unused" disk LU status) is smaller than the storage capacity of the designated virtual disk. The total storage capacity of the plurality of disk devices 12 and the total storage capacity of one or more unused disk LU can be referenced with the appropriate timing by the indication program 21 or management program 31.

Thereafter, the control program 1110 judges whether copying from tape to disk is required (step 802).

For example, when writing to the designated virtual disk is for the first time (for example, when the fact that writing to the designated virtual disk is for the first time could be specified from the virtual disk management table 150) the control program 1110 judges that copying is unnecessary. This is because data to be read does not exist in the tape LU corresponding with the designated virtual disk.

Further, for example, the control program 1110 judges that copying is unnecessary when valid data already exist in the reserved disk cache. 'Valid data' are the same data as the data in a tape LU that corresponds with the designated virtual disk. That is, 'effective data exist' means that data of the tape LU corresponding with the designated virtual disk exist in the disk cache. This can be specified by referencing the last tape LUN address (See FIG. 7) corresponding with the disk LUN of the respective disk LUs that constitute the disk cache. More specifically, when the data of the tape LUN corresponding with the designated virtual disk and the last tape LUN addresses corresponding with the disk LUN of the respective disk LUs constituting the disk cache all match, 'a case where valid data exists' results. It is judged that copying is unnecessary when valid data exists because all the data in the tape LU corresponding with the designated virtual disk already exists in the disk cache.

When it is judged that copying is unnecessary, the control program 1110 ends the processing to change the virtual disk status of the designated virtual disk to "Active". On the other hand, when it is judged that copying is required, the control program 1110 changes the virtual disk status of the designated virtual disk to "Activate" and moves to the next step 803.

When it is judged that copying from tape to a disk device is required, the tape control module 1115 prepares a target tape 132 in the tape drive 131 (step 803). Here, the 'target tape' is a tape comprising a tape LUN that corresponds with the designated virtual disk (that is, the tape LUN of the read target)

When the target tape 132 is prepared in the tape drive 131, the tape control module 1115 reads data from the target tape 132 to the memory 111 of the controller 11(step 804).

The data thus read are written to the reserved disk cache by the disk control module 1114 (step 805).

The tape control module 1115 continues reading the target tape 132 when data to be read remain on the target tape 132 (No in step 806) and repeats steps 804 to 805. The tape control module 1115 ends the reading of the target tape 132 when data to be read no longer remains (step 806).

When the reading of the target tape 132 ends, the tape control module 1115 implements end processing for tape such as rewinding or unloading of the target tape 132 (step 807).

If the data of the designated virtual disk can all be prepared on the disk cache, the control program 1110 changes the virtual disk status of the designated virtual disk to "Active" and ends the processing. When data are stored across a plurality of target tapes 132 (NO in step 808), the control program 1110 returns to step 803, switches the target tape 132 if necessary, and continues copying. Further, when a plurality of tape drives 131 can be used, the control program 1110 may read the plurality of target tapes 132 in parallel at the same time from the respective tape drives 131. The indication program 21 or management program 31 monitors the virtual disk status of the designated virtual disk 14 at fixed intervals and, as a result of sensing an "Active" status, is able to ascertain that the preparations for the designated virtual disk 14 are complete. In other words, the indication program 21 or management program 31 may perform control so that read commands or write commands are not issued by the host 2 when the virtual disk status of the designated virtual disk 14 is not "Active".

Processing that is performed when an Activate indication is received was described hereinabove. Further, the following target tape judgment processing is performed from a YES in step 802 to step 803 in FIG. 13.

Figure 14:
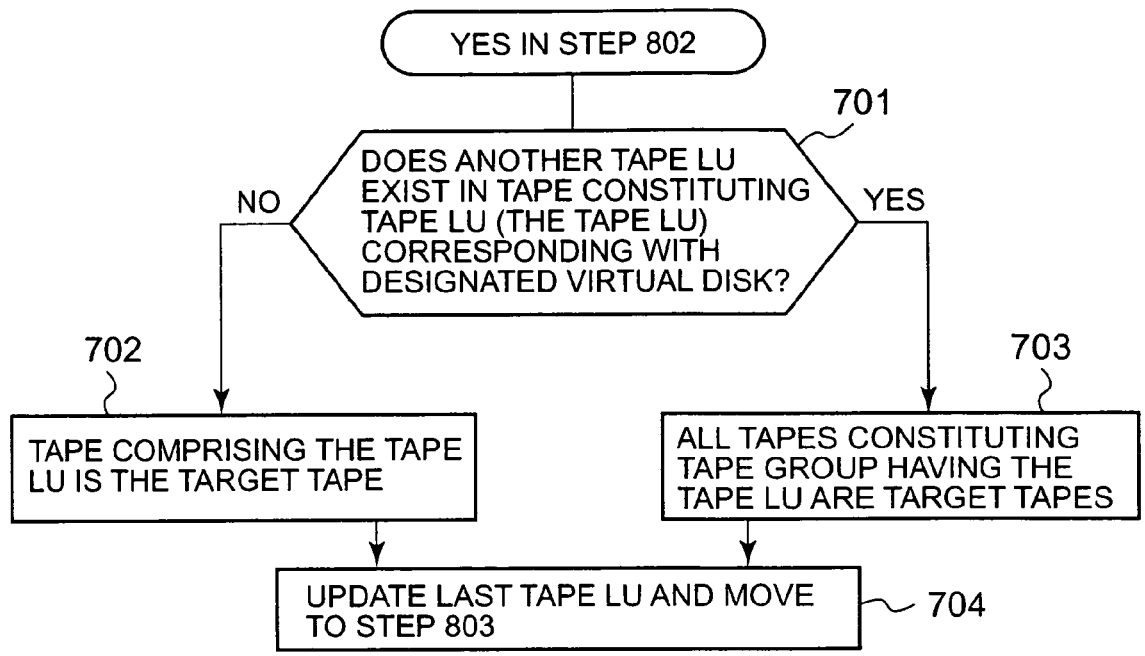
FIG. 14 shows an example of target tape judgment processing.

FIG. 14 shows an example of target tape judgment processing.

When it is possible to specify from the tape group management table 152 and tape LU management table 153 (See FIG. 9) that another tape LU does not exist on the tape 132 constituting the tape LU ('the tape LU' hereinbelow) 142 that corresponds with the designated virtual disk 14 (NO in step 701), the control program 1110 makes the tape 132 having the tape LU 142 the so-called target tape 132 in step 806 (step 702).

On the other hand, when it is not possible to specify from the tape group management table 152 and tape LU management table 153 that another tape LU does not exist on the tape 132 constituting the tape LU 142 (YES in step 701), the control program 1110 renders all of the tapes 132 constituting the tape group comprising the tape LU 142 target tapes 132 respectively (step 703).

That is, the control program 1110 reads all the data recorded on the tapes 132. In other words, the control program 1110 exercises control so that writing does not end only in a portion of the tapes 132 in the processing according to the subsequently described Inactivate indication. As a result, the reading of data from the tapes 132 to the disk cache and the writing of data from the disk cache to the tapes 132 can be performed sequentially. Further, when the data of a plurality of tape LUs are read on one disk cache, the mapping of addresses on the disk cache to the tape LUs can be managed by means of a table (not illustrated) and, therefore, it can be specified which data on the disk cache should be written to a particular tape LU.

Following step 702 or 703, the control program 1110 associates tape LUN on the target tape 132 with each of the disk LUs 141 constituting the reserved disk cache (the tape LUN in step 702 or all the tape LUN in the tape group in step 703, for example) as the last tape LUN addresses (See FIG. 7) before moving on to step 803 in FIG. 13 (step 704).

Figure 15:
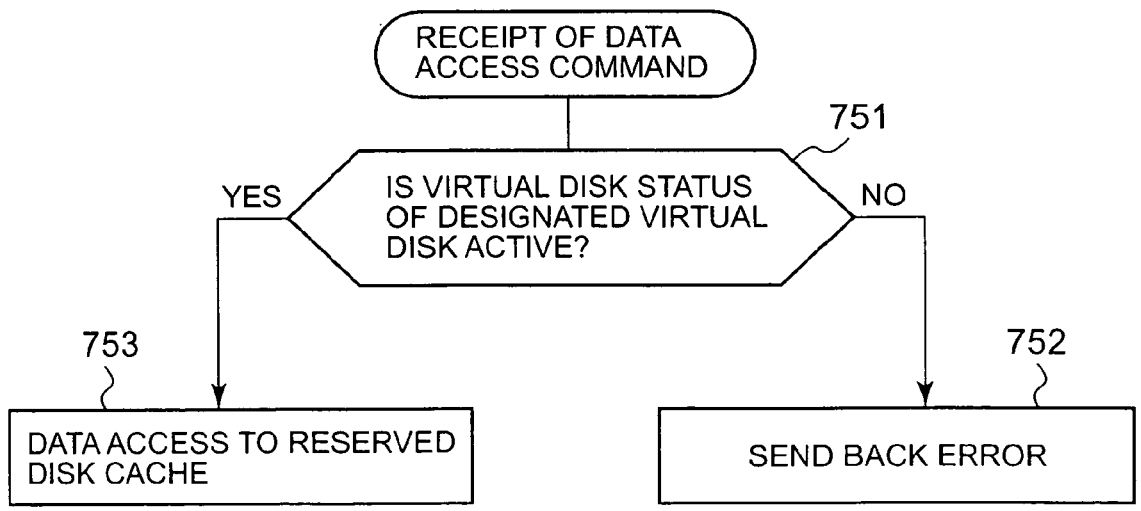
FIG. 15 shows an example of data access control processing that is performed by the control program 1110.

FIG. 15 shows an example of data access control processing that is performed by the control program 1110.

The control program 1110 references the status management table 1112 when a data access command (a read command or write command) is received from the host 2 and judges whether the virtual disk status of the virtual disk designated by the data access command (more specifically, the virtual disk mapped to the host information designated by the data access command, for example) is "Active". When the status is not "Active" (NO in step 751), the control program 1110 sends back an error to the host 2 (step 752) and is able to prompt the issue of the Activate indication. On the other hand, when the virtual disk status of the designated virtual disk 14 is "Active" (YES in step 751), the control program 1110 performs data access (data reading or writing) with respect to the disk cache reserved for the virtual disk 14 (step 753).

Virtual disk end processing will be described next. When data access to the designated virtual disk 14 ends, the indication program 21 or management program 31 issues an end indication to the virtual disk library system 1. This indication is called an 'Inactivate indication'. The total storage capacity of the disk devices 12 is smaller than the total storage capacity of the virtual disk 14. Hence, the reserved disk cache (that is, disk space) must be released from the virtual disk 14 that is not performing data access. The indication program 21 or management program 31 issues an Inactivate indication to an Active-state virtual disk (the designated virtual disk for which the Activate indication was issued, for example) as a result of a manual operation by the user or administrator or automatically upon detection of the end of a backup or archive.

Figure 16:
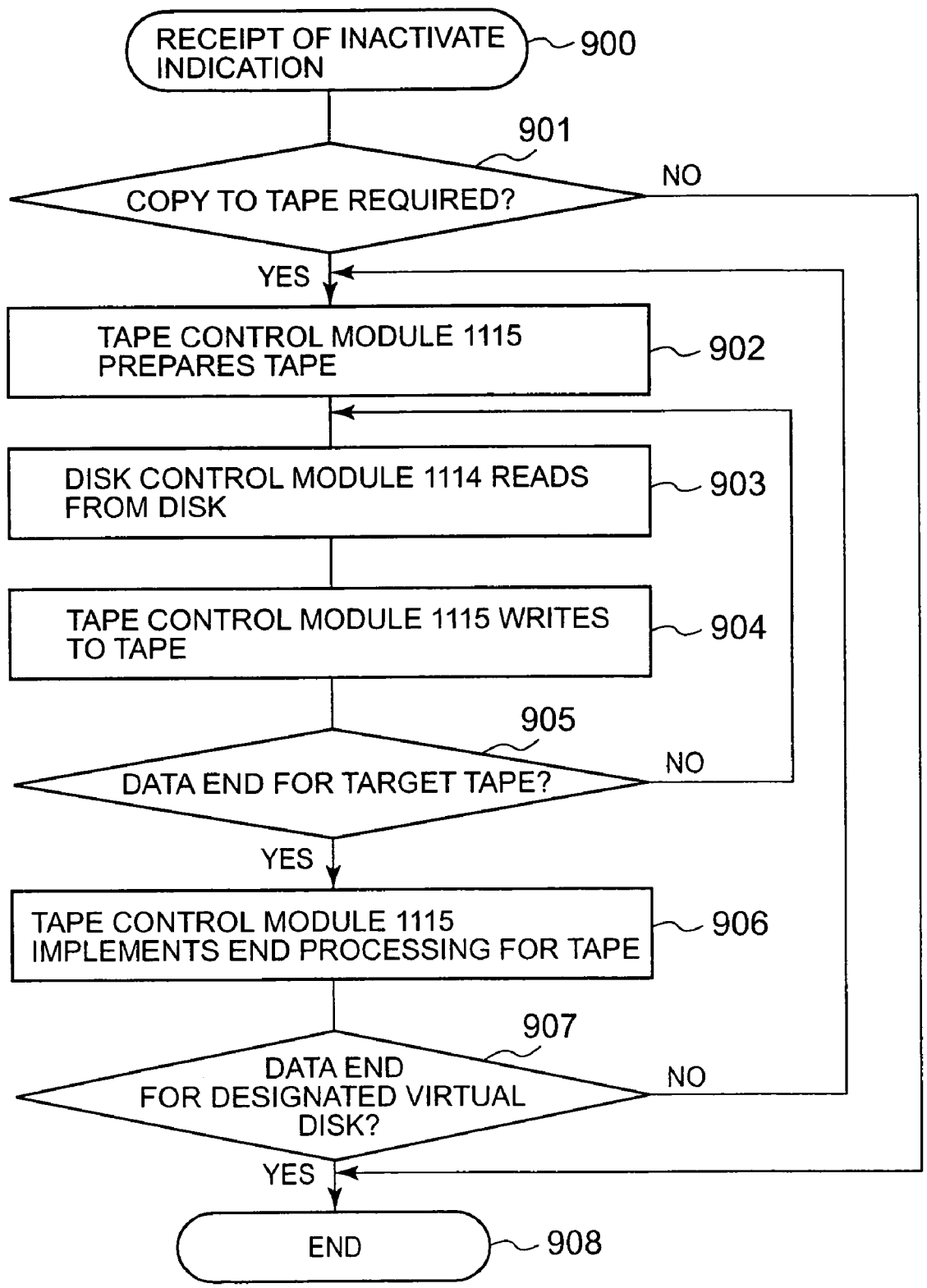
FIG. 16 shows an example of the flow of processing that is performed when the control program 1110 receives an Inactivate indication.

FIG. 16 shows an example of the flow of processing that is performed when the control program 1110 receives an Inactivate indication. Further, in the following description, the virtual disk that corresponds with the virtual disk LUN or virtual group ID designated by the Inactivate indication is called the 'designated virtual disk'.

Upon receiving the Inactivate indication from the indication program 21 or management program 31 (step 900), the control program 1110 judges whether copying from the disk cache to the tapes 132 is required (step 901). For example, the control program 1110 judges that copying is unnecessary when there has been no update to the disk cache during an Active state. This is because there is no difference between all the data in the disk cache corresponding with the designated virtual disk 14 and all the data in the tape LU (or all of the tape LUs in the tape group that correspond with the designated virtual disk) 142 corresponding with the designated virtual disk 14. When it is judged that copying is unnecessary, the control program 1110 ends the processing to change the virtual disk status of the designated virtual disk 14 (See FIG. 10) to "Inactive". When it is judged that copying is required, the control program 1110 changes the virtual disk status of the designated virtual disk 14 to "Inactivate" and progresses to the next step 902.

When it is judged that copying from the disk cache to the tapes 132 is required, the tape control module 1115 prepares the target tape 132 in the tape drive 131 (step 902). The 'target tape' here is a tape 132 that comprises the tape LU 142 that corresponds with the disk cache. Hence, for example, when step 702 in FIG. 14 is executed, the target tape is the tape 132 that comprises the tape LU corresponding with the designated virtual disk and, when step 703 is executed, the target tape is the respective tapes 132 constituting the tape group that corresponds with the designated virtual disk.

When the target tape 132 is prepared in the tape drive 131, the disk control module 1114 reads data from the disk cache (disk LU) to the memory 111 of the controller 11 (step 903). The data thus read are written to the target tape 132 by the tape control module 1115 (step 904).

The disk control module 1114 continues to read from the disk cache when data to be read remain in the disk cache (NO in step 905) and repeats steps 903 to 904. The disk control module 1114 ends the reading when the data to be read no longer remain (YES in step 905).

When the writing to the target tape 132 has ended, the tape control module 1115 implements end processing for tape such as rewinding or unloading of the target tape 132 (step 906).

If the data in the disk cache can all be stored on the target tape 132 (YES in step 907), the control program 1110 changes the virtual disk status of the designated virtual disk 14 to "Inactive", updates the disk LUN 111*c* (See FIG. 4) and the disk LU status 154*d* (See FIG. 7) and ends the processing. On the other hand, when data are stored across a plurality of target tapes 132, the control program 1110 returns to step 902 and continues copying by switching the target tape 132 if necessary (step 907). Further, when a plurality of tape drives 131 can be used, the control program 1110 may write a plurality of target tapes 132 in parallel at the same time from the respective tape drives 131. Further, data are copied from the disk cache to the target tape 132 and, therefore, the data written to the target tape 132 remain in the disk cache of the copy source. Hence, for example, when a disk LU constituting the disk cache of the designated virtual disk is temporarily released and re-allocated as disk cache to the designated virtual disk without the data in the disk LU being updated, all the data in the tape LU corresponding with the designated virtual disk remain in the disk LU.

The indication program 21 or management program 31 monitors the virtual disk status of the designated virtual disk 14 at fixed intervals and is able to ascertain that designated virtual disk end processing is complete by sensing an Inactive state. When the end processing is complete, the backup source data may be deleted because the storage of data to the tape is assured.

According to the embodiment hereinabove, in the virtual disk library system 1, all the data in the tape LU 142 are prepared on the disk devices 12 before access to the tape LU 142 occurs and access to the tape LU 142 is made with respect to the disk devices 12 and not the tape 132. As a result, access to the tape LU 132 can be performed at a higher speed than in a case where the tape 132 is actually accessed (that is, performed at the same speed as the access to the disk devices 12).

Another embodiment of the present invention will now be described hereinbelow. In the following description, the differences from the embodiment above are mainly described and a description of the points common to the embodiment above is omitted or simplified.

In another embodiment, in addition to read and write with respect to the disk cache, that is, in addition to normal access modes, access modes of two different types, which are 'sequential read' where data are read from the tape 132 to the host 2 without passing via the disk cache, and 'sequential write' in which data are written from the host 2 to the tape 132 without passing via the disk cache, are prepared. Sequential read can be used in restoring the whole of a virtual disk, for example. Sequential write can be used for a backup of an entire virtual disk, for example.

FIG. 17 shows an example of an IO management table 1113 according to another embodiment of the present invention.

Four types of virtual disk statuses, namely "SeqRead", "SR-prepare", "SeqWrite", and "SW-prepare" are also added. "SeqRead" permits only Read and disables Write. "SR-prepare" is a state of transition to "SeqRead". "SeqWrite" disables Read and permits only Write. "SW-prepare" is a state of transition to "SeqWrite".

The indication program 21 or management program 31 is able to issue a SeqRead command for indicating a sequential read and a SeqWrite command for indicating a sequential write.

Figure 18:
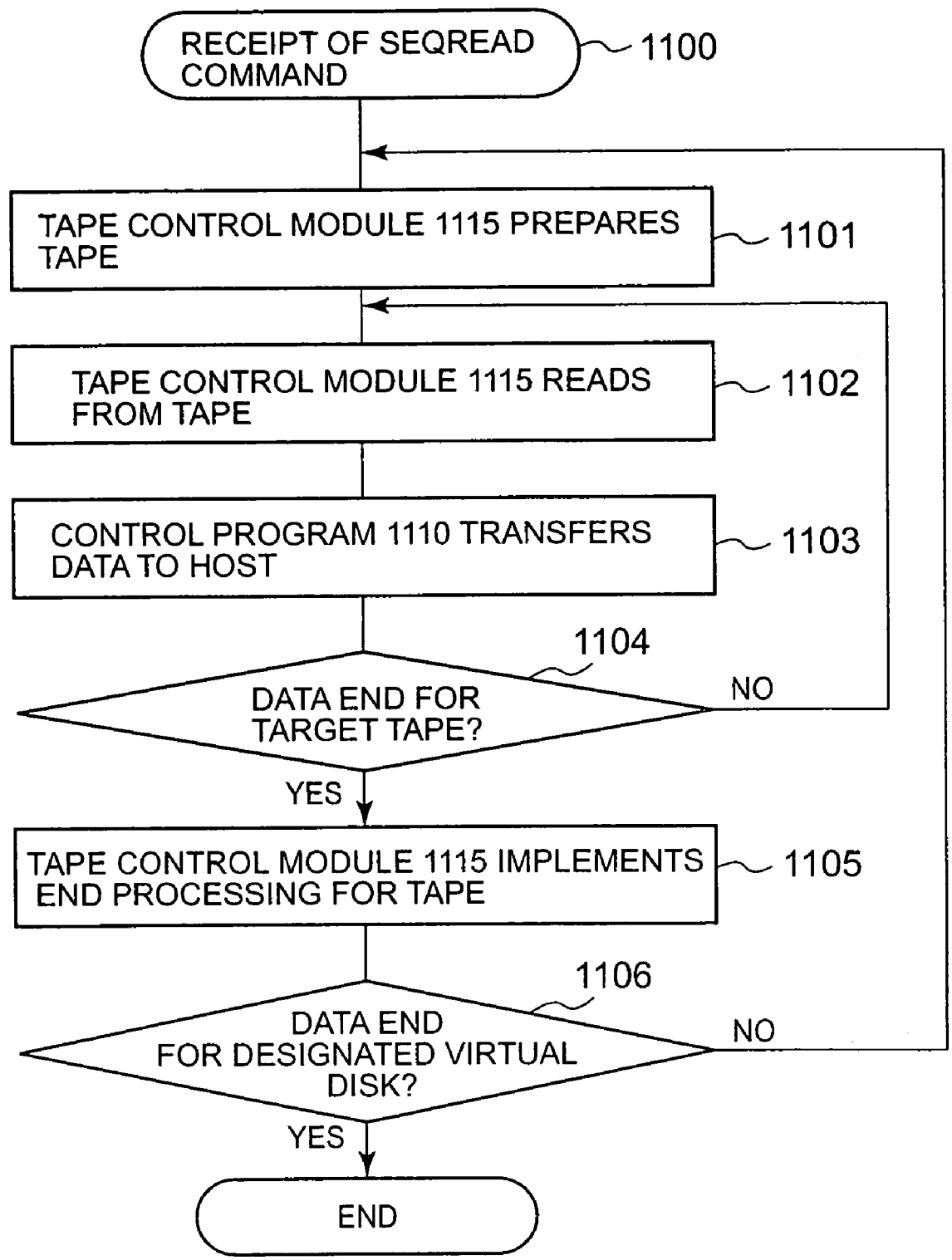
FIG. 18 is a flowchart showing an example of the flow of processing performed when the control program 1110 receives a SeqRead command.

FIG. 18 is a flowchart showing an example of the flow of processing that is performed when the control program 1110 receives a SeqRead command.

When the SeqRead command is received (step 1100), the control program 1110 changes the virtual disk status of the virtual disk (designated virtual disk hereinbelow) 14 designated by the SeqRead command to "SR-prepare" and the tape control module 1115 prepares the tape corresponding with the designated virtual disk 14 ('target tape' hereinbelow) 132 in the tape drive 131 (step 1101).

Once the target tape 132 is prepared in the tape drive 131, the control program 1110 changes the virtual disk status of the designated virtual disk 14 to "SeqRead" and the tape control module 1115 reads data to the memory 111 of the controller 11 from the prepared target tape 132 (step 1102).

The host 2 monitors the virtual disk status of the designated virtual disk 14 at fixed intervals after the SeqRead command is issued and issues a read command to the designated virtual disk upon detecting that the virtual disk status is "SeqRead". The control program 1110 transfers data read to the memory 111 in accordance with the read command from the host 2 to the host 2 (step 1103).

When data to be read remains on the target tape 132 (NO in step 1104), the tape control module 1115 continues reading from the target tape 132 and, when data to be read does not remain (YES instep 1104), the tape control module 1115 ends the reading of the target tape 132.

When the reading from the target tape 132 has ended, the tape control module 1115 implements end processing for tape such as rewinding or unloading of the tape. (step 1105).

When the data from the designated virtual disk 14 have all been read (YES in step 1106), the processing ends. When data are stored across a plurality of target tapes 132, the tape control module 1115 returns to step 1101 and is able to continue reading by switching the target tape 132 if necessary. So that the read data does not overflow from the memory 111, the control program 1110 is also able to change the speed of reading from the target tape 132 in accordance with a read command from the host 2. Further, when a disk LU has been allocated, writing may be performed to the disk in parallel with the reading to the host. When it has not been possible to prepare data in the memory 111 because the speed of data transfer to the host 2 is faster than the speed of reading from the target tape 132, the control program 1110 is also able to report the fact that data are being prepared to the host 2. The host 2, which receives the report to the effect that data are being prepared, is able to retry the read command after a fixed time has elapsed.

Figure 19:
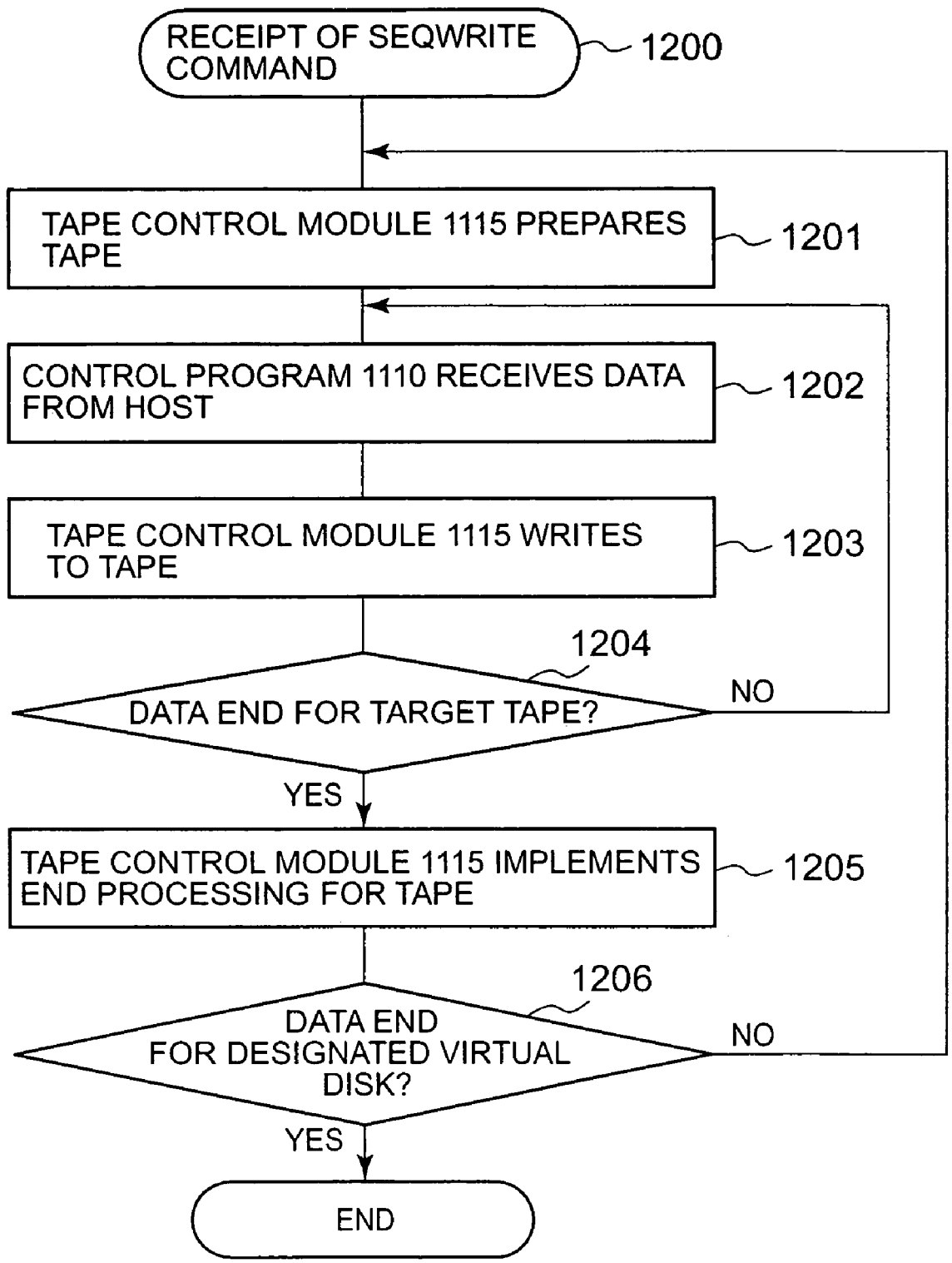
FIG. 19 is a flowchart showing an example of the flow of processing performed when the control program 1110 receives a SeqWrite command.

FIG. 19 is a flowchart showing an example of the flow of the processing that is performed when the control program 1110 receives a SeqWrite command.

When the SeqWrite command is received (step 1200), the control program 1110 changes the virtual disk status of the virtual disk (designated virtual disk hereinbelow) 14 designated by the SeqWrite command to "SW-prepare" and the tape control module 1115 prepares tape (target tape hereinbelow) 132 that corresponds with the designated virtual disk 14 in the tape drive 131 (step 1101).

If the target tape 132 is prepared in the tape drive 131, the control program 1110 changes the virtual disk status of the designated virtual disk 14 to "SeqWrite". The host 2 monitors the virtual disk status of the designated virtual disk 14 at fixed intervals after the SeqWrite command is issued and, when it is detected that the virtual disk status is "SeqWrite", the host 2 issues a write command and data for the designated virtual disk. The control program 1110 writes data from the host 2 to the memory 111 in accordance with the write command from the host 2 (step 1202). The tape control module 1115 writes the data written to the memory 111 to the prepared target tape 132 (step 1203).

When write data remain in the memory 111 (NO in step 1204), the tape control module 1115 continues writing to the target tape 132 and, when data to be written do not remain (YES in step 1204), the tape control module 1115 ends writing to the target tape 132.

When writing to the target tape 132 ends, the tape control module 1115 implements end processing for tape such as tape rewinding or unloading or the like (step 1205).

When the writing of data to the designated virtual disk 14 has ended (YES in step 1206), the processing ends. When data are written across a plurality of target tapes 132, the tape control module 1115 returns to step 1201 and is able to continue writing by switching the target tape 132 if necessary. When a disk LU has been allocated as during a SeqRead, writing to disk may be performed in parallel with writing to tape.

According to another embodiment above, in addition to a normal access mode in which the disk cache is used, sequential read in which data are read from the tape LU to the host 2 without passing via the disk cache and sequential write in which data are written from the host 2 to the tape LU without passing via the disk cache are prepared. By suitably using the plurality of access modes in accordance with the application (backup or restore, for example), an increase in the speed with which the entire virtual disk is read and written and so forth can be expected. More specifically, when the entire virtual disk is restored, for example, an increase in the speed of copying the entire virtual disk to the host 2 can be expected by issuing a SeqRead command to the virtual disk.

A few preferred embodiments of the present invention were described hereinabove. These embodiments are illustrations serving to explain the present invention, there being no intention to limit the scope of the present invention to these embodiments alone. The present invention can also be implemented in a variety of other forms.

For example, the virtual disk 14 may be fixedly mapped to the disk LU 12 instead of being mapped to the tape LU 142. In other words, the plurality of disk LUs 141 may include a disk LU 141 that is fixedly mapped to the virtual disk 14 and a disk LU 141 that is dynamically mapped to the virtual disk 14. As a result, both tape access in which the disk cache is utilized and disk access where tape access does not occur can be performed by one virtual disk library system 1.

Moreover, reading or writing in tape group units may also be performed in the case of sequential read, for example. More specifically, in the case of a tape LU that is mapped to the virtual disk 14 designated by the SeqRead command, for example, when a plurality of tape LUs exist on the tape that constitutes the tape LU, data may be read from all the tapes 132 that constitute the tape group comprising the tape LU.

What is claimed is:

1. A storage system connected to one or more higher-level devices including a host, comprising:
   a plurality of tape media for storing data;
   a storage device capable of performing random access, which is access in which the access destination varies randomly, at a higher speed than the tape media;
   a plurality of virtual storage devices that emulate the storage device; and
   a controller for controlling data access commands from the host,
   wherein the controller reserves storage space on one or more of the storage devices for a designated virtual storage device which is a virtual storage device designated among the plurality of virtual storage devices, reads data to the storage space from a target tape medium which is a tape medium that corresponds with the designated virtual storage device among the plurality of tape media and, upon receiving a data access command with respect to the designated virtual storage device from the host, performs data access to the storage space and not to the target tape medium.

2. The storage system according to claim 1, wherein a tape LU that is a logical storage unit is mapped to each of the plurality of virtual storage devices;
   when another tape LU exists in a tape medium having an end of a target tape LU that is mapped to the designated virtual storage device, the controller reads data to the storage space from two or more tape LUs including the target tape LU and the other tape LU; and
   data of other tape LUs do not exist in the tape medium having the ends of two or more tape LUs beyond the ends of the tape LUs.

3. The storage system according to claim 1, wherein the controller pre-reads data in the target tape medium to the storage space before data access to the designated virtual storage device occurs.

4. The storage system according to claim 3, wherein the controller accepts a predetermined prepare command with respect to the designated virtual storage device from any of the one or more higher-level devices and, when the prepare command is received, the controller reserves the storage space for the designated virtual storage device.

5. The storage system according to claim 4, wherein the controller manages the status of the designated virtual storage device and sends back the status in response to an inquiry from the host, rendering the status of the designated virtual storage device a first status while data are being read from the target tape medium to the storage space and rendering the status of the designated virtual storage device a second status when the reading of data from the target tape medium to the storage space has ended.

6. The storage system according to claim 1, wherein the controller reserves the released storage space and, when a predetermined event has occurred, releases the reserved storage space.

7. The storage system according to claim 1, wherein the controller does not perform data reading from the target tape medium to the storage space when data of a read target from the target tape medium already exist in the reserved storage space.

8. The storage system according to claim 1, wherein the controller does not perform data reading from the target tape medium to the storage space when data access to the designated virtual storage device is made for the first time.

9. The storage system according to claim 1, wherein the controller writes data in the reserved storage space to the target tape medium when a predetermined event has occurred.

10. The storage system according to claim 9, wherein the controller accepts a predetermined prepare end command with respect to the designated virtual storage device from any of the one or more higher-level devices and, when the prepare end command is received, writes data in the storage space for the designated virtual storage device to the target tape medium.

11. The storage system according to claim 10, wherein the controller manages the status of the designated virtual storage device and sends back the status in response to an inquiry from the host, rendering the status of the designated virtual storage device a third status while data in the storage space are being written to the target tape medium, and rendering the status of the designated virtual storage device a fourth status when the writing of data in the storage space to the target tape medium has ended.

12. The storage system according to claim 9, wherein the controller does not write data in the reserved storage space to the target tape medium even when the predetermined event occurs when the writing of data to the reserved storage space has not taken place.

13. The storage system according to claim 1, wherein the controller controls whether direct access is made to the tape medium in accordance with the access mode selected among access modes of a plurality of types.

14. The storage system according to claim 13, wherein the access modes of the plurality of types include sequential read mode; and, when the sequential read mode is selected, the controller reads data from the target tape medium and transmits the data to the host without passing the data via the one or more storage devices.

15. The storage system according to claim 14, wherein the sequential read mode is selected when the entire designated virtual storage device is restored.

16. The storage system according to claim 13, wherein the access modes of the plurality of types include a sequential write mode; and
when the sequential write mode is selected, the controller receives data from the host and writes the received data to the target tape medium without passing the data via the one or more storage devices.

17. The storage system according to claim 16, wherein the sequential write mode is selected when the entire designated virtual storage device is backed up.

18. The storage system according to claim 1, wherein two or more tape LUs constituting logical storage units are prepared in the plurality of tape media;
each of the two or more tape LUs are mapped to each of the plurality of virtual storage devices;
two or more storage device LUs constituting logical storage units are prepared in the one or more storage devices; and
the controller accepts a predetermined prepare command with respect to the designated virtual storage device from any of the one or more higher-level devices and, when the prepare command is received, reserves one or more released storage device LUs equivalent to a storage capacity equal to or more than the target tape LU mapped to the designated virtual storage device, reads data from the target tape LU to the one or more reserved storage device LUs, and accepts a predetermined prepare end command with respect to the designated virtual storage device from any of the one or more higher-level devices and, when the prepare end command is received, writes data on the one or more storage device LUs to the target tape LU and releases the one or more storage device LUs.

19. A storage control method implemented by a computer system that comprises one or more higher-level devices and a storage system that is connected to the one or more higher-level devices, in which the one or more higher-level devices include at least a host, and the storage system comprises: a plurality of tape media for storing data; one or more storage devices; a plurality of virtual storage devices that emulate the storage devices; and a controller for controlling data access commands from the host,
the storage control method comprising:
a step in which any of the one or more higher-level devices transmits a predetermined prepare command to a designated virtual storage device constituting a certain virtual storage device among the plurality of virtual storage devices;
a step in which the controller receives the predetermined prepare command and reserves storage space in the one or more storage devices for the designated virtual storage device in response to the prepare command, and reads data to the storage space from the target tape medium constituting the tape medium that corresponds with the designated virtual storage device among the plurality of tape media;
a step in which the host transmits a data access command to the designated virtual storage device; and
a step in which the controller performs data access to the storage space and not to the target tape medium when the data access command is received.

20. A storage system connected to one or more higher-level devices including a host, comprising:
a plurality of tape media for storing data;
a storage device capable of performing random access, which is access in which the access destination varies randomly, at a higher speed than the tape media;
a plurality of virtual storage devices that emulate the storage device; and
a controller for controlling data access commands from the host,
wherein a tape LU constituting a logical storage unit is mapped to each of the plurality of virtual storage devices;
two or more storage device LUs constituting logical storage units are prepared in the one or more storage devices;
the controller executes (A) to (F) below:
(A) the controller accepts a predetermined prepare command with respect to a designated virtual storage device which is a virtual storage device designated among the plurality of virtual storage devices from any of the one or more higher-level devices;
(B) when the prepare command is received, in a case where another tape LU exists in a tape medium having an end of a target tape LU that is mapped to the designated virtual storage device, the controller renders each of two or more tape LUs comprising the target tape LU and the other tape LU the target tape LU and reserves one or more released storage device LUs equivalent to a storage capacity equal to or more than all the target tape LUs, whereas, when another tape LU does not exist in the tape medium having the end of the target tape LU, the controller reserves one or more released storage device LUs equivalent to a storage capacity equal to or more than the target tape LU;

(C) the controller reads data from the target tape LU to the one or more reserved storage device LUs;
(D) the controller performs data access to the one or more reserved storage device LUs and not to the target tape LU when a data access command with respect to the designated virtual storage device is received from the host;
(E) the controller accepts a predetermined prepare end command to the designated virtual storage device from any of the one or more higher-level devices; and (F) when the prepare end command is received, the controller writes data on the one or more storage device LUs to the target tape LU that is the source of the data reading and releases the one or more storage device LUs,
and wherein data of other tape LUs do not exist in the tape medium having the ends of two or more tape LUs, beyond the ends of the two or more tape LUs in (B) above.

* * * * *